(12) United States Patent
Nakagawa et al.

(10) Patent No.: US 10,974,489 B2
(45) Date of Patent: Apr. 13, 2021

(54) MULTILAYER LAMINATED FILM AND PROCESSED ARTICLE USING SAME

(71) Applicant: TEIJIN FILM SOLUTIONS LIMITED, Tokyo (JP)

(72) Inventors: Dai Nakagawa, Tokyo (JP); Nobuyuki Nakanishi, Tokyo (JP); Tomoka Yoshimura, Tokyo (JP); Mitsuo Tojo, Tokyo (JP)

(73) Assignee: TEIJIN FILM SOLUTIONS LIMITED, Tokyo (JP)

( * ) Notice: Subject to any disclaimer, the term of this patent is extended or adjusted under 35 U.S.C. 154(b) by 0 days.

(21) Appl. No.: 16/464,889

(22) PCT Filed: Nov. 28, 2017

(86) PCT No.: PCT/JP2017/042503
§ 371 (c)(1),
(2) Date: May 29, 2019

(87) PCT Pub. No.: WO2018/101230
PCT Pub. Date: Jun. 7, 2018

(65) Prior Publication Data
US 2019/0322087 A1 Oct. 24, 2019

(30) Foreign Application Priority Data
Nov. 30, 2016 (JP) .............................. JP2016-232633

(51) Int. Cl.
*B32B 27/08* (2006.01)
*B32B 7/02* (2019.01)
(Continued)

(52) U.S. Cl.
CPC ................ *B32B 27/08* (2013.01); *B32B 7/02* (2013.01); *B32B 27/36* (2013.01); *G02B 5/305* (2013.01);
(Continued)

(58) Field of Classification Search
CPC ........................................................ B32B 27/08
(Continued)

(56) References Cited

U.S. PATENT DOCUMENTS

| 5,448,404 A | 9/1995 | Schrenk et al. |
| 2014/0287211 A1 | 9/2014 | Oya et al. |

(Continued)

FOREIGN PATENT DOCUMENTS

| CN | 101094880 A | 12/2007 |
| CN | 101193743 A | 6/2008 |

(Continued)

OTHER PUBLICATIONS

International Search Report for PCT/JP2017/042503 dated Feb. 20, 2018 [PCT/ISA/210].

*Primary Examiner* — Brent T O'Hern
(74) *Attorney, Agent, or Firm* — Sughrue Mion, PLLC (57) ABSTRACT

A laminated film has a multilayer structure with outermost layers 1 and 2 composed mainly of a resin, wherein the multilayer structure has first and second layers alternately laminated in the thickness direction so that the total number of the first and second layers is 30 or more, the first layer is a birefringent layer composed mainly of a resin and is 10-1,000 nm thick, the second layer is an isotropic layer composed mainly of a resin and is 10-1,000 nm thick, the thicknesses of the first and second layers increase along the thickness direction from the outermost layer 2 side to the outermost layer 1 side, the total thickness of the outermost layers is 10% or more of the total thickness of the multilayer structure, and the thickness of the outermost layer 1 is larger than the thickness of the outermost layer 2.

9 Claims, 1 Drawing Sheet

(51) Int. Cl.
  *B32B 27/36* (2006.01)
  *G02B 5/30* (2006.01)
(52) U.S. Cl.
  CPC ........ *G02B 5/3083* (2013.01); *B32B 2250/05* (2013.01); *B32B 2250/244* (2013.01); *B32B 2250/42* (2013.01); *B32B 2255/10* (2013.01); *B32B 2255/26* (2013.01); *B32B 2457/202* (2013.01)
(58) Field of Classification Search
  USPC ........................................................ 428/113
  See application file for complete search history.

(56) References Cited

U.S. PATENT DOCUMENTS

2014/0327958 A1  11/2014  Yoshimura et al.
2017/0205549 A1* 7/2017  Shimizu ................. B32B 27/36

FOREIGN PATENT DOCUMENTS

| | | |
|---|---|---|
| CN | 101516620 A | 8/2009 |
| CN | 102046379 A | 5/2011 |
| CN | 103890619 A | 6/2014 |
| JP | 4-268505 A | 9/1992 |
| JP | 8-503312 A | 4/1996 |
| JP | 9-506837 A | 7/1997 |
| JP | 9-506984 A | 7/1997 |
| JP | 2007-237435 A | 9/2007 |
| JP | 2009-37235 A | 2/2009 |
| WO | 01/47711 A1 | 7/2001 |
| WO | 2006/044075 A1 | 4/2006 |
| WO | 2006/113375 A1 | 10/2006 |
| WO | 2008/039683 A1 | 4/2008 |
| WO | 2009/134595 A1 | 11/2009 |
| WO | 2013/080987 A1 | 6/2013 |
| WO | 2016/010162 A1 | 1/2016 |

* cited by examiner

US 10,974,489 B2

MULTILAYER LAMINATED FILM AND PROCESSED ARTICLE USING SAME

CROSS REFERENCE TO RELATED APPLICATIONS

This application is a National Stage of International Application No. PCT/JP2017/042503, filed on Nov. 28, 2017, which claims priority from Japanese Patent Application No. 2016-232633, filed on Nov. 30, 2016.

TECHNICAL FIELD

The present invention relates to a multilayer laminated film and a processed article using the same.

BACKGROUND ART

A multilayer laminated film formed by alternately laminating a layer having a low refractive index and a layer having a high refractive index with a large number of layers can be used as an optical interference film which selectively reflects or transmits a light having a specific wavelength due to interference of light caused by the structure between the layers. In such a multilayer laminated film, by gradually changing the thickness of each layer along the thickness direction of the film, or putting on the multilayer laminated film a film having a reflection peak different from that of the laminated film, the resultant film can reflect or transmit a light in a wide wavelength range, and can achieve a high reflectance equivalent to that obtained by a film using a metal, and thus can be used as a metalescent film or a reflective mirror. Further, it has been known that, by unidirectionally stretching the multilayer laminated film, the resultant film can be used as a reflective polarizing film which reflects only a specific polarized light component, and can be used in a luminance improving member for liquid crystal display and the like (PTLs 1 to 4 and the like).
PTL 1: JP-A-4-268505
PTL 2: JP-T-9-506837 (the term "JP-T" as used herein means a published Japanese translation of a PCT patent application)
PTL 3: JP-T-9-506984
PTL 4: International Patent Application Publication No. 01/47711 pamphlet

DISCLOSURE OF INVENTION

Technical Problem

However, the present inventors have found that the multilayer laminated film in which the thickness of each layer is gradually changed along the thickness direction, which has been conventionally studied, has a problem in that the film curls due to structural ununiformity in the thickness direction when the film experiences high temperatures in the post-processing or the film in the form of an ultimate product is used at high temperatures, or the like, and they paid attention to this problem. Further, according to the present inventors, this problem is likely to be caused particularly in the multilayer laminated film having a birefringent layer and an isotropic layer.

An object of the present invention is to provide a multilayer laminated film which is prevented from curling upon being treated at high temperatures, despite having a multilayer structure in which a birefringent layer and an isotropic layer are alternately laminated on one another with the large number of layers, wherein the thickness of each layer is gradually changed.

Solution to Problem

The present inventors have conducted extensive and intensive studies with a view toward solving the above-mentioned problems. As a result, it has been found that, by disposing the outermost layers respectively on one side of the multilayer structure and on the other side in a specific mode such that the outermost layers have different thicknesses from each other, it is possible to prevent the multilayer laminated film from curling upon being treated at high temperatures, and the present invention has been completed.

Specifically, an object of the present invention is achieved by the following construction.

1. A multilayer laminated film including: a multilayer structure; an outermost layer 1 composed mainly of a resin on one side of the multilayer structure; and an outermost layer 2 composed mainly of a resin on another side, wherein
the multilayer structure has a first layer and a second layer that are alternately laminated in a thickness direction so that the total number of the first and second layers is 30 or more,
the first layer is a birefringent layer composed mainly of a resin and having a thickness of 10 nm to 1,000 nm,
the second layer is an isotropic layer composed mainly of a resin and having a thickness of 10 nm to 1,000 nm,
the thickness of the first layer and the thickness of the second layer increase along the thickness direction from the outermost layer 2 side to the outermost layer 1 side,
when the total thickness of the multilayer structure is taken as 100%, the total thickness of the outermost layer 1 and the outermost layer 2 is 10% or more, and
the thickness of the outermost layer 1 is larger than the thickness of the outermost layer 2.

2. The multilayer laminated film according to item 1, which has a (thickness of the outermost layer 1)/(thickness of the outermost layer 2) ratio of 1.1 to 10.0.

3. The multilayer laminated film according to item 1 or 2, wherein each of the first layer and the second layer increasing in thickness along the thickness direction has a (maximum 15% average thickness)/(minimum 15% average thickness) ratio of 1.2 to 8.0.

4. The multilayer laminated film according to any one of items 1 to 3, wherein each of the first layer and the second layer increasing in thickness along the thickness direction monotonously increases in thickness.

5. The multilayer laminated film according to any one of items 1 to 4, wherein the resin constituting the first layer is an oriented crystalline resin.

6. The multilayer laminated film according to any one of items 1 to 5, wherein the outermost layer 1 and the outermost layer 2 are isotropic layers.

7. A multilayer laminated film product including: the multilayer laminated film according to any one of items 1 to 6; and a coating layer on the outermost layer 1 or the outermost layer 2 of the multilayer laminated film.

8. A multilayer laminated film product including: the multilayer laminated film according to any one of items 1 to 6; and a curing resin layer on the outermost layer 1 or the outermost layer 2 of the multilayer laminated film.

Advantageous Effects of Invention

In the present invention, there can be provided a multilayer laminated film which is prevented from curling upon being treated at high temperatures, despite having a multilayer structure in which a birefringent layer and an isotropic layer are alternately laminated on one another with the large number of layers, wherein the thickness of each layer is gradually changed.

DESCRIPTION OF EMBODIMENTS

[Multilayer Laminated Film]

Figure 1:
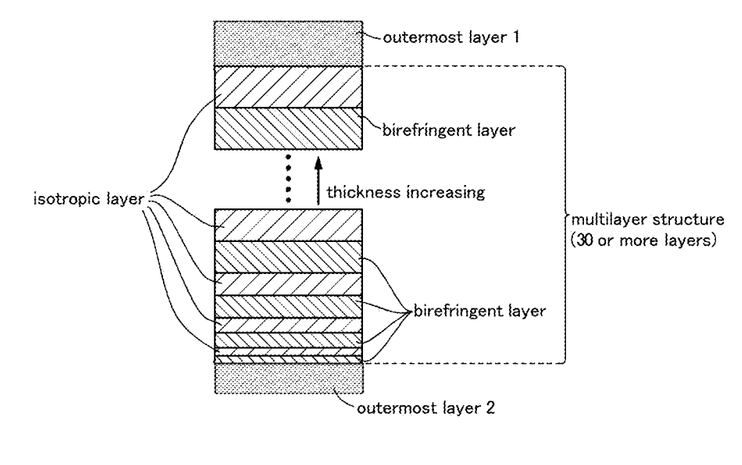
The FIGURE shows an embodiment of the present invention including its layer arrangement.

The multilayer laminated film of the present invention is a multilayer laminated film having a multilayer structure in which a first layer which is birefringent and a second layer which is isotropic are alternately laminated on one another, an outermost layer 1 on one side of the multilayer structure and an outermost layer 2 on the other side. In the invention, with respect to the refractive index in each of the machine direction (which corresponds to the film-forming machine axial direction, and which is also referred to as "longitudinal direction" or "MD"), the transverse direction (which corresponds to the direction perpendicular to the machine direction in the plane of the film, and which is also referred to as "width direction" or "TD"), and the thickness direction, a film having a difference between the maximum and the minimum of 0.1 or more is defined as being birefringent, and a film having a difference of less than 0.1 is defined as being isotropic.

Hereinbelow, the components constituting the present invention will be described in detail.

[Multilayer Structure]

The multilayer laminated film of the invention has a multilayer structure. The multilayer structure is a structure in which a first layer and a second layer are alternately laminated in the thickness direction so that the total number of the first and second layers is 30 or more, wherein the first layer is a birefringent layer composed mainly of a resin and having a thickness of 10 to 1,000 nm, and the second layer is an isotropic layer composed mainly of a resin and having a thickness of 10 to 1,000 nm. The expression that the layer is "composed mainly of" a resin indicates that the resin constitutes 70% by mass or more, preferably 80% by mass or more, more preferably 90% by mass or more of each layer. The resins constituting the respective layers are described below in detail, but, with respect to the resin constituting the first layer, there is no particular limitation as long as a birefringent layer can be formed from the resin, and, with respect to the resin constituting the second layer, there is no particular limitation as long as an isotropic layer can be formed from the resin. In any case, from the viewpoint of facilitating the formation of a film, a thermoplastic resin is preferred.

(Number of the Laminated Layers in the Multilayer Structure)

In the multilayer structure in the invention, the first layer and the second layer are alternately laminated so that the total number of the first and second layers is 30 or more. When the number of the laminated layers in the multilayer structure is less than 30, it is difficult for the multilayer structure to have the first layer and the second layer having different thicknesses, making it difficult to reflect a light in a wide wavelength range. More specifically, for example, a function of the multilayer laminated film as a metalescent film or a reflective mirror is difficult to obtain, and, when the multilayer laminated film is used as a luminance improving member or a reflective polarizer for liquid crystal display or the like, with respect to the reflecting properties at the reflection axis, it is difficult to obtain a high average reflectance in a wide wavelength range of 400 to 800 nm. On the other hand, when the number of the laminated layers in the multilayer structure is small, only a low reflectance can be obtained.

From the viewpoint of broadening the wavelength range which the film deals with or the viewpoint of increasing the reflectance, the number of the laminated layers in the multilayer structure is preferably larger, preferably 50 or more, more preferably 100 or more, further preferably 150 or more. On the other hand, from the viewpoint of the productivity, the handling properties of the film, and the like, the number of the laminated layers in the multilayer structure is preferably 2,001 or less, but may be further reduced from the viewpoint of the productivity and handling properties as long as the intended reflecting properties can be obtained, and may be, for example, 1,001 or less, 501 or less, or 301 or less.

(Thickness of Each Layer of the Multilayer Structure)

The thickness of each layer for the first layer and the second layer is 10 to 1,000 nm. The thickness indicates a physical thickness. By controlling the optical thickness which is a product of a thickness and a refractive index of each layer, the reflection wavelength can be designed, making it possible to design the reflecting properties. The first layer and the second layer are respectively birefringent and isotropic and hence, taking into consideration a general refractive index of the resin preferably used in these layers, the layer having a thickness smaller than or larger than the above-mentioned thickness is considered to be unlikely to affect the light reflectance properties. The thickness of each layer for the first layer is preferably 10 nm or more, more preferably 13 nm or more, and is preferably 500 nm or less, more preferably 400 nm or less, further preferably 350 nm or less. The thickness of each layer for the second layer is preferably 10 nm or more, more preferably 13 nm or more, further preferably 16 nm or more, and is preferably 500 nm or less, more preferably 400 nm or less, further preferably 380 nm or less. The thickness of each layer can be determined from a photograph taken using a transmission electron microscope.

When the multilayer laminated film of the invention is used as a luminance improving member or a reflective polarizer for liquid crystal display or the like, the reflection wavelength range of the multilayer laminated film is preferably from a visible light region to a near-infrared region, and, when the thickness of each layer for the first layer and the second layer is in the above-mentioned range, the multilayer laminated film can selectively reflect a light in such a preferred wavelength range due to interference of light between the layers. When the thickness of each layer is too large, the reflection wavelength range is in an infrared region, and, when the thickness of each layer is too small, the reflection wavelength range is in an ultraviolet region, and, in the case where the resin is a polyester, the layer is likely to absorb a light, so that the reflecting performance becomes poor.

(Distribution of the Thickness of the Multilayer Structure)

By virtue of having the first layer and the second layer having different thicknesses, the multilayer structure can reflect a light in a wide wavelength range.

For achieving the above-mentioned object, in the multilayer structure in the invention, the thickness of the first layer and the thickness of the second layer are increased along the thickness direction from the outermost layer 2 side to the outermost layer 1 side. The wording that the thickness of the layer is "increased" preferably indicates that the layer positioned on the outermost layer 1 side is larger in thickness than the layer positioned on the outermost layer 2 side throughout the multilayer structure, but the wording is not limited to this meaning, and may indicate a tendency that the thickness of the layer is increased as viewed in the multilayer structure as a whole. More specifically, in a graph obtained by numbering the layers from the outermost layer 2 side toward the outermost layer 1 side, and plotting them as the abscissa and the thicknesses of the respective layers as the ordinate, when the slope of the linear approximation is positive, the thickness of the layer is considered to be increased. The first layer and the second layer can be considered separately, and the increase of the first layer and the increase of the second layer in thickness can have different slopes. Further, the above-mentioned increase of the thickness of the layer may be of a mode in which the thickness is increased throughout the multilayer structure from the outermost surface layer on one side to the outermost surface layer on the other side, but may be of a mode in which the thickness is increased in a portion which is 80% or more, preferably 90% or more, more preferably 95% or more of the multilayer structure, in terms of the number of the layers, and the thickness of the layer in the remaining portion of the multilayer structure may be constant or decreased. The mode in which the thickness is increased or decreased is frequently expressed as the thickness having a slope.

With respect to the slope of the increase of the thickness of each of the first layer and the second layer, when the slope is appropriate, the multilayer laminated film can reflect a light in a wide wavelength range. On the other hand, when the slope is too large, the multilayer laminated film is likely to curl. Therefore, when the thickness of the first layer and the thickness of the second layer are increased along the thickness direction, it is preferred that the (maximum 15% average thickness)/(minimum 15% average thickness) ratio is 1.2 to 8.0. The maximum 15% average thickness is a value obtained by, with respect to the region of the first layer or the second layer in which the thickness is increased, extracting 15% of the layers present in the region, in terms of the number of the layers, which layers have a larger thickness in the region, and determining an average of the thicknesses of the extracted layers. Similarly, the minimum 15% average thickness is a value obtained by, with respect to the region of the first layer or the second layer in which the thickness is increased, extracting 15% of the layers present in the region, in terms of the number of the layers, which layers have a smaller thickness in the region, and determining an average of the thicknesses of the extracted layers. In the first layer or the second layer, when the (maximum 15% average thickness)/(minimum 15% average thickness) ratio is small, the wavelength range of a light which the film can reflect is likely to be narrowed. For example, in use applications, such as a luminance improving member and a reflective polarizer, with respect to the reflecting properties at the reflection axis, it is likely that it is difficult to obtain a uniform average reflectance in a wide wavelength range of 400 to 800 nm and that the reflective polarizing performance becomes low. On the other hand, when the (maximum 15% average thickness)/(minimum 15% average thickness) ratio is large, it is likely that the reflection wavelength range is broader than 400 to 800 nm so that the reflectance at each wavelength is reduced, leading to a reduction of the reflectance in the required range. In use applications, such as a luminance improving member and a reflective polarizer, the reflectance at the reflection axis is likely to be reduced, causing the reflective polarizing performance to be poor. From such a point of view, the (maximum 15% average thickness)/(minimum 15% average thickness) ratio is more preferably 1.3 or more, further preferably 1.4 or more, especially preferably 1.5 or more, and is more preferably 6.0 or less, further preferably 5.0 or less, especially preferably 4.0 or less.

In the multilayer structure in the invention, it is desired that the increase of the thickness of each of the first layer and the second layer is a monotonous increase. The term "monotonous increase" means that, in the first layer or the second layer, the layers in the region in which the thickness is increased are equally divided into five areas, in terms of the number of the layers, and the average of thicknesses in each area equally divided is monotonously increased from the outermost layer 2 side to the outermost layer 1 side.

[Outermost Layer]

The multilayer laminated film of the invention has an outermost layer 1 on one side of the multilayer structure and an outermost layer 2 on the other side, wherein the thickness of the outermost layer 1 is larger than the thickness of the outermost layer 2. By simultaneously achieving the above-mentioned mode related to the increase of the thickness of each layer for the first layer and the second layer in the multilayer structure and the present mode related to the outermost layer, it is possible to prevent the film from curling upon being treated at high temperatures. That is, in the multilayer structure, the outermost layer having a smaller thickness is disposed on the side in which the layers are smaller in thickness and the outermost layer having a larger thickness is disposed on the side in which the layers are larger in thickness. This exhibits unexpected effects differing from those obtained with a multilayer structure in which the outermost layer having a larger thickness is merely disposed for a balance on the side where the layers are smaller in thickness.

It is preferred that the thickness of the outermost layer 1 and the thickness of the outermost layer 2 satisfy the thickness ratio of the outermost layers of 1.1 to 10.0, which is defined by the formula (1) below. By virtue of this, the film can be further advantageously prevented from curling upon being treated at high temperatures.

Thickness ratio of the outermost layers=(Thickness of the outermost layer 1)/(Thickness of the outermost layer 2)     Formula (1)

When the thickness ratio of the outermost layers is 1.0 or less, it is likely that it is difficult to suppress curling caused in the multilayer structure upon being treated at high temperatures. On the other hand, when the thickness ratio of the outermost layers is more than 10.0, ununiformity of the thickness of the outermost layer 1 and outermost layer 2 is likely to cause curling in the direction opposite to the direction of the curling caused when the multilayer structure is solely used or the thickness ratio of the outermost layers is 1.0 or less. From such a point of view, the thickness ratio of the outermost layers is more preferably 1.5 or more, further preferably 2.0 or more, and is more preferably 8.0 or less, further preferably 6.0 or less, especially preferably 5.5 or less.

[Composition of the Resin for the Multilayer Laminated Film]

[Composition of the Resin for the First Layer]

In the multilayer laminated film of the invention, the first layer constituting the multilayer structure is a birefringent layer, that is, the resin constituting the first layer is capable of forming a birefringent layer. Therefore, the resin constituting the first layer is preferably an oriented crystalline resin, and the oriented crystalline resin is especially preferably a polyester. The polyester preferably contains ethylene terephthalate units and/or ethylene naphthalate units, more preferably ethylene naphthalate units, in an amount in the range of 80 to 100 mol %, based on the mole of the repeating units constituting the polyester, because the layer having a higher refractive index can be easily formed, facilitating an increase of the difference in refractive index between the first layer and the second layer. When the resins are used in combination, the amount is a total amount of the resins contained.

(Polyester for the First Layer)

A preferred polyester for the first layer contains a naphthalenedicarboxylic acid component as a dicarboxylic acid component, and preferably has a naphthalenedicarboxylic acid component content of 80 to 100 mol %, based on the mole of the dicarboxylic acid component constituting the polyester. Examples of the naphthalenedicarboxylic acid components include a 2,6-naphthalenedicarboxylic acid component, a 2,7-naphthalenedicarboxylic acid component, a component derived from a combination of these components, and a derivative component thereof, and especially preferred examples include a 2,6-naphthalenedicarboxylic acid component and a derivative component thereof. The content of the naphthalenedicarboxylic acid component is preferably 85 mol % or more, more preferably 90 mol % or more, and is preferably less than 100 mol %, more preferably 98 mol % or less, further preferably 95 mol % or less.

As the dicarboxylic acid component constituting the polyester for the first layer, in addition to the naphthalenedicarboxylic acid component, a terephthalic acid component, an isophthalic acid component, or the like may be further contained as long as the effects aimed at by the invention are not sacrificed, and especially, a terephthalic acid component is preferably contained. The content of the second dicarboxylic acid component is preferably in the range of more than 0 to 20 mol %. The content of the second dicarboxylic acid component is more preferably 2 mol % or more, further preferably 5 mol % or more, and is more preferably 15 mol % or less, further preferably 10 mol % or less.

When the multilayer laminated film is used as a luminance improving member or a reflective polarizer for use in a liquid crystal display or the like, it is preferred that the first layer is a layer having relatively higher refractive index properties than the second layer, the second layer is a layer having relatively lower refractive index properties than the first layer, and the film is stretched in a uniaxial direction. In this case, in the invention, the uniaxially stretching direction is frequently referred to as "X direction", the direction perpendicular to the X direction in the plane of the film is frequently referred to as "Y direction" (also referred to as "non-stretching direction"), and the direction perpendicular to the plane of the film is frequently referred to as "Z direction" (also referred to as "thickness direction").

By using the above-mentioned polyester containing a naphthalenedicarboxylic acid component as a main component in the first layer, a high refractive index in the X direction is exhibited, and simultaneously birefringent properties with high uniaxially orientation property can be achieved, and thus a difference in the refractive index in the X direction between the first layer and the second layer can be increased, and this contributes to achievement of a high degree of polarization. On the other hand, when the amount of the naphthalenedicarboxylic acid component contained is less than the lower limit, the noncrystalline properties are enhanced, and a difference between the refractive index nX in the X direction and the refractive index nY in the Y direction is likely to be reduced. Therefore, it is likely that satisfactory reflecting performance cannot be obtained with respect to the P polarized light component in the invention, which is defined as a polarized light component parallel to the surface of incidence including the uniaxially stretching direction (X direction), taking the film surface in the multilayer laminated film as a reflective surface. The S polarized light component in the invention is defined as a polarized light component perpendicular to the surface of incidence including the uniaxially stretching direction (X direction), taking the film surface in the multilayer laminated film as a reflective surface.

As the diol component constituting the preferred polyester for the first layer, an ethylene glycol component is used, and the amount of the ethylene glycol component contained is preferably 80 to 100 mol %, more preferably 85 to 100 mol %, further preferably 90 to 100 mol %, especially preferably 90 to 98 mol %, based on the mole of the diol component constituting the polyester. When the amount of the diol component is less than the lower limit, the above-mentioned uniaxially orientation property is likely to become poor.

As the diol component constituting the polyester for the first layer, in addition to the ethylene glycol component, a trimethylene glycol component, a tetramethylene glycol component, a cyclohexanedimethanol component, a diethylene glycol component, or the like may be further contained as long as the effects aimed at by the invention are not sacrificed.

(Properties of the Polyester for the First Layer)

The polyester used in the first layer preferably has a melting point in the range of 220 to 290° C., more preferably in the range of 230 to 280° C., further preferably in the range of 240 to 270° C. The melting point can be determined by measurement using a differential scanning calorimeter (DSC). When the melting point of the polyester is more than the upper limit, it is likely that the polyester being formed by melt extrusion is poor in fluidity, causing discharge and the like to be ununiform. On the other hand, when the melting point of the polyester is less than the lower limit, excellent film-forming properties are achieved, but the mechanical properties of the polyester and the like are likely to deteriorate, and, when the film is used as a luminance improving member or a reflective polarizer for liquid crystal display, the film is unlikely to exhibit refractive index properties.

The polyester used in the first layer preferably has a glass transition temperature (hereinafter, frequently referred to as "Tg") in the range of 80 to 120° C., more preferably to 118° C., further preferably 85 to 118° C., especially preferably 100 to 115° C. When the Tg of the polyester is in the above range, the resultant film has excellent heat resistance and dimensional stability, and, when the film is used as a luminance improving member or a reflective polarizer for liquid crystal display, the film readily exhibits refractive index properties. The melting point and glass transition temperature of the polyester can be controlled by appropriately selecting the type of the copolymer component, the amount of the component copolymerized, and diethylene glycol which is a by-product, and the like.

The polyester used in the first layer preferably has an intrinsic viscosity of 0.50 to 0.75 dl/g, more preferably 0.55 to 0.72 dl/g, further preferably 0.56 to 0.71 dl/g, as measured using an o-chlorophenol solution at 35° C. By virtue of having such an intrinsic viscosity, it is likely that the first layer has appropriate oriented crystalline properties, causing a difference in refractive index between the first layer and the second layer.

[Composition of the Resin for the Second Layer]

In the multilayer laminated film of the invention, the second layer constituting the multilayer structure is an isotropic layer, that is, the resin constituting the second layer is capable of forming an isotropic layer. Therefore, the resin constituting the second layer is preferably a noncrystalline resin. Especially, a noncrystalline polyester is preferred. The term "noncrystalline" does not exclude a resin having extremely slight crystalline properties, but indicates that the second layer can be isotropic such that the function aimed at by the multilayer laminated film of the invention is exhibited.

(Copolymerized Polyester for the Second Layer)

The resin constituting the second layer is preferably a copolymerized polyester, and, particularly, a copolymerized polyester containing a naphthalenedicarboxylic acid component, an ethylene glycol component, and a trimethylene glycol component as copolymer components is preferably used. Examples of the naphthalenedicarboxylic acid components include a 2,6-naphthalenedicarboxylic acid component, a 2,7-naphthalenedicarboxylic acid component, a component derived from a combination of these components, and a derivative component thereof, and especially preferred examples include a 2,6-naphthalenedicarboxylic acid component and a derivative component thereof. The term "copolymer component" used in the invention means any of the components constituting the polyester, and is not limited to the copolymer component as a minor component (which is a component copolymerized in an amount of less than 50 mol %, based on the mole of the all acid components or the all diol components), but includes a main component (which is a component copolymerized in an amount of 50 mol % or more, based on the mole of the all acid components or the all diol components).

In the invention, as mentioned above, a polyester having ethylene naphthalate units as a main component is preferably used as the resin for the first layer, and, in such a case, by using a copolymerized polyester containing a naphthalenedicarboxylic acid component as the resin for the second layer, it is likely that the compatibility of the second layer with the first layer is increased, improving the interlaminar adhesion to the first layer, so that delamination is advantageously unlikely to be caused.

The copolymerized polyester for the second layer preferably contains, as a diol component, at least two components of an ethylene glycol component and a trimethylene glycol component. Among these, the ethylene glycol component is preferably used as a main diol component from the viewpoint of the film-forming properties and the like.

The copolymerized polyester for the second layer in the invention preferably further contains a trimethylene glycol component as a diol component. The trimethylene glycol component contained in the polyester improves the elastic properties of the layer structure, so that an effect of suppressing the delamination is enhanced.

The amount of the naphthalenedicarboxylic acid component, preferably 2,6-naphthalenedicarboxylic acid component is preferably 30 to 100 mol %, more preferably 30 to 80 mol %, further preferably 40 to 70 mol %, based on the mole of the all carboxylic acid components constituting the copolymerized polyester for the second layer. This component can further increase the adhesion to the first layer. When the amount of the naphthalenedicarboxylic acid component contained is less than the lower limit, the adhesion is likely to be reduced from the viewpoint of the compatibility. With respect to the upper limit of the amount of the naphthalenedicarboxylic acid component contained, there is no particular limitation, but, when the amount is too large, a difference in refractive index is unlikely to be caused between the first layer and the second layer. For controlling the refractive index of the second layer in relation with the refractive index of the first layer, another dicarboxylic acid component may be copolymerized.

The amount of the ethylene glycol component is preferably 50 to 95 mol %, more preferably 50 to 90 mol %, further preferably 50 to 85 mol %, especially preferably 50 to 80 mol %, based on the mole of the all diol components constituting the copolymerized polyester for the second layer. By virtue of this, it is likely that a difference in refractive index is readily caused between the first layer and the second layer.

The amount of the trimethylene glycol component is preferably 3 to 50 mol %, more preferably 5 to 40 mol %, further preferably 10 to 40 mol %, especially preferably 10 to 30 mol %, based on the mole of the all diol components constituting the copolymerized polyester for the second layer. This component can further increase the interlaminar adhesion to the first layer. Further, it is likely that a difference in refractive index is readily caused between the first layer and the second layer. When the amount of the trimethylene glycol component contained is less than the lower limit, it is likely that it is difficult to secure the interlaminar adhesion, and, when the amount of the trimethylene glycol component contained is more than the upper limit, it is difficult to obtain a resin having a desired refractive index and glass transition temperature.

The second layer in the invention may contain a thermoplastic resin other than the copolymerized polyester as a second polymer component in the range of 10% by mass or less, based on the mass of the second layer, as long as the effects aimed at by the invention are not sacrificed.

(Properties of the Copolymerized Polyester for the Second Layer)

In the invention, the above-mentioned copolymerized polyester for the second layer preferably has a glass transition temperature of 85° C. or higher, more preferably 90 to 150° C., further preferably 90 to 120° C., especially preferably 93 to 110° C. By virtue of this, more excellent heat resistance can be obtained. Further, it is likely that a difference in refractive index is readily caused between the first layer and the second layer. When the glass transition temperature of the copolymerized polyester for the second layer is less than the lower limit, it is likely that a satisfactory heat resistance cannot be obtained. For example, when subjected to steps including a heat treatment at about 90° C., the second layer is likely to suffer crystallization or embrittlement to increase the haze, so that the resultant film which is to be used as a luminance improving member or a reflective polarizer has lowered a degree of polarization. Further, when the glass transition temperature of the copolymerized polyester for the second layer is too high, stretching is likely to cause the polyester for the second layer to have birefringence due to stretching, so that the difference in the refractive index in the stretching direction between the first layer and the second layer is reduced, causing the reflecting performance to become poor.

Among the above-mentioned copolymerized polyesters, a noncrystalline copolymerized polyester is preferred from the viewpoint of extremely advantageously suppressing the increase of the haze caused due to crystallization in a heat treatment at a temperature of 90° C. for 1,000 hours. The term "noncrystalline" used here means that, when the temperature is increased at a temperature increase rate of 20° C./minute in the measurement using a DSC, the heat of fusion of crystal is less than 0.1 mJ/mg.

Specific examples of the copolymerized polyesters for the second layer include (1) a copolymerized polyester containing a 2,6-naphthalenedicarboxylic acid component as a dicarboxylic acid component and an ethylene glycol component and a trimethylene glycol component as a diol component, and (2) a copolymerized polyester containing a 2,6-naphthalenedicarboxylic acid component and a terephthalic acid component as a dicarboxylic acid component and an ethylene glycol component and a trimethylene glycol component as a diol component.

The copolymerized polyester for the second layer preferably has an intrinsic viscosity of 0.50 to 0.70 dl/g, further preferably 0.55 to 0.65 dl/g, as measured using an o-chlorophenol solution at 35° C. When the copolymerized polyester used in the second layer has a trimethylene glycol component as a copolymer component, the film-forming properties likely become poor, and, by using the copolymerized polyester having an intrinsic viscosity in the above-mentioned range, it is possible to further improve the film-forming properties. The intrinsic viscosity of the above-mentioned copolymerized polyester used as the second layer is preferably higher from the viewpoint of the film-forming properties, but, when the intrinsic viscosity is higher than the upper limit, it is likely that the difference in melt viscosity between the polyester for the first layer and the polyester for the second layer is increased, causing the thicknesses of the layers to be ununiform.

[Composition of the Resin for the Outermost Layer]

The outermost layer 1 and outermost layer 2 constituting the multilayer laminated film of the invention are individually composed mainly of a resin. The expression that the outermost layer is "composed mainly of" a resin indicates that the resin constitutes 70% by mass or more, preferably 80% by mass or more, more preferably 90% by mass or more of each layer. Further, the outermost layer 1 and the outermost layer 2 are preferably an isotropic layer, and may be the same resin as that for the second layer from the viewpoint of ease of production, and can be composed of the above-mentioned copolymerized polyester for the second layer, and such an embodiment is preferred. Particularly, when the thickness ratio of the outermost layer 1 and the outermost layer 2 to the multilayer laminated film is relatively large, the multilayer laminated film having the outermost layers which are an isotropic layer is more likely to be prevented from curling upon being treated at high temperatures and therefore, also from such a point of view, the outermost layer 1 and the outermost layer 2 are preferably an isotropic layer.

[Other Layers]
(Intermediate Layer)

The multilayer laminated film of the invention may comprise an intermediate layer in addition to the above-mentioned outermost layer 1, outermost layer 2, first layer, and second layer.

In the invention, the intermediate layer is also referred to as "inner thick film layer" or the like, and indicates a layer of a thick film present inside the alternately laminated layer construction formed from the first layer and the second layer. The term "thick film" used here means an optically thick film. In the invention, a method is preferably used in which a layer having a large thickness (which is frequently referred to as "thickness controlling layer" or "buffer layer") is formed on both sides of the alternately laminated material in the initial stage of the production of the multilayer laminated film, and then the number of the laminated layers is increased by doubling, and, in this case, the two layers having a large thickness are laminated to form an intermediate layer, and the thick film layer formed inside and obtained by such a method is referred to as "intermediate layer", and the thick film layer formed outside is referred to as "outermost layer".

The intermediate layer, for example, preferably has a thickness of 5 μm or more, and preferably has a thickness of 100 μm or less, more preferably 50 μm or less. When having the intermediate layer in part of the alternately laminated layer construction formed from the first layer and the second layer, the thickness of the layers constituting the first layer and the second layer can be easily controlled to be uniform without affecting the polarizing function. The intermediate layer may have the same composition as that of any of the first layer and the second layer or a composition partially having the composition of the first layer or the second layer, and the intermediate layer has a large thickness and hence does not contribute to the reflecting properties. Meanwhile, the intermediate layer likely affects the transmission properties and therefore, for example, when particles are contained in the intermediate layer, the particle diameter and particle concentration can be selected taking a light transmittance into consideration.

When the thickness of the intermediate layer is less than the lower limit, disorder is likely caused in the layer construction of the multilayer structure, so that the reflecting performance becomes poor. On the other hand, when the thickness of the intermediate layer is more than the upper limit, the thickness of the whole of the multilayer laminated film is increased, and the resultant film is unlikely to be a space-saver when used as a reflective polarizer or a luminance improving member for thin liquid crystal display. Further, when the multilayer laminated film has therein a plurality of intermediate layers, the thickness of each intermediate layer is preferably the lower limit of the above-mentioned range or more, and the total thickness of the intermediate layers is preferably the upper limit of the above-mentioned range or less.

The polymer used in the intermediate layer may use a resin different from the first layer or the second layer as long as the layer can be present in the multilayer structure using the method for producing the multilayer laminated film of the invention, but, from the viewpoint of the interlaminar adhesion, the polymer preferably has the same composition as that of any of the first layer and the second layer or a composition partially having the composition of the first layer or the second layer.

With respect to the method for forming the intermediate layer, there is no particular limitation, but, for example, one layer of the intermediate layer can be formed by a method in which a layer having a large thickness is formed on both sides of the alternately laminated material before subjected to doubling, and the resultant laminated material is divided into two parts using a dividing block called a layer doubling block in the direction perpendicular to the alternately laminating direction, and the divided parts are re-laminated in the alternately laminating direction. A plurality of intermediate layers can be formed by dividing the laminated material into three or four parts according to the similar method.

(Coating Layer)

The multilayer laminated film of the invention can have a coating layer on at least one surface thereof. Examples of such coating layers include a lubricating layer for imparting lubricating properties, and a primer layer for imparting bonding properties with a prism layer, a diffusion layer or the like. The coating layer contains a binder component, and may contain, for example, particles for imparting lubricating properties to the layer. For imparting bonding properties, a binder component chemically close to the component of the layer to be bonded is used. A coating liquid for forming the coating layer is preferably an aqueous coating liquid using water as a solvent from the environmental point of view, and, particularly in such a case and the like, for the purpose of improving the wettability of the coating liquid with the laminated multilayer film, the coating liquid can contain a surfactant. In addition, a functional agent may be added to the coating layer, for example, for improving the strength of the coating layer, a crosslinking agent may be added.

[Thickness of the Multilayer Laminated Film]

The thickness of the multilayer laminated film of the invention may be appropriately selected according to the use of the film, but is preferably 15 to 200 μm, further preferably 30 to 150 μm. The multilayer laminated film having such a thickness readily exhibits desired optical properties, and, when used in a liquid crystal display, the thickness of the film is not too large and contributes to weight reduction or downsizing of the display.

In the multilayer laminated film of the present invention, when the total thickness of the multilayer structure is taken as 100%, the total thickness of the outermost layer 1 and the outermost layer 2 is 10% or more. By virtue of this, the multilayer laminated film can be easily prevented from curling upon being treated at high temperatures. When the total thickness of the outermost layers is less than 10%, it is likely that it is difficult to prevent the multilayer laminated film from curling upon being treated at high temperatures. On the other hand, the total thickness of the outermost layer 1 and the outermost layer 2 is preferably 60% or less, and, when the total thickness of the outermost layers is more than 60%, contribution of the multilayer structure is reduced, and the resultant film likely has unsatisfactory optical properties, such as reflective polarizing performance, when used as a luminance improving member or a reflective polarizer.

In the invention, the multilayer laminated film may have therein a plurality of multilayer structures. For example, there is an embodiment of the multilayer laminated film having the above-mentioned intermediate layer and multilayer structures on both sides of the intermediate layer. With respect to the increasing direction of the thickness of the first layer and the second layer, the multilayer structures may have either the same direction or different directions. Further, the multilayer laminated film may contain a multilayer structure having no slope of the thickness. In the case of the multilayer laminated film having the multilayer structures having different increasing directions of the thickness, the multilayer laminated film may be of an embodiment such that the increasing direction of the thickness in the multilayer structure which occupies a larger part of the multilayer structures having a slope of the thickness, and the arrangement of the outermost layer 1 and the outermost layer 2 are defined by the present invention.

In the invention, from the viewpoint of broadening the reflection wavelength range and increasing the reflectance at each wavelength, an embodiment of the multilayer laminated film having a plurality of multilayer structures is preferred, and the number of the multilayer structures is preferably 2 to 5, more preferably 2 to 3. Further, in the case of the multilayer laminated film having a plurality of multilayer structures, an embodiment of the multilayer laminated film in which the multilayer structures have the same slope direction for the increase of the thickness can be formed by a method using a layer doubling block, and production of the film is easy. The multilayer laminated film having such a construction is likely to curl upon being treated at high temperatures, and the application of the technique of the invention to the film can exhibit especially an excellent effect such that the film is prevented from curling. When forming the multilayer laminated film having multilayer structures having different slope directions for the increase of the thickness, a plurality of multilayer feed blocks must be used, causing the production facilities to be complicated.

[Thickness of Each Layer]

As specific examples of preferred thicknesses of the layers in the multilayer laminated film of the invention, there can be mentioned the followings. The total thickness of the first layer and the second layer in the multilayer structure is preferably in the range of 20 to 60 μm, further preferably 30 to 50 μm. The thickness of the outermost layer 1 is preferably in the range of 5 to 30 μm, further preferably 10 to 20 μm. The thickness of the outermost layer 2 is preferably in the range of 2 to 15 μm, further preferably 5 to 10 μm.

[Uniaxially Stretched Film]

The multilayer laminated film of the invention may be a uniaxially stretched film or a biaxially stretched film for obtaining the intended optical properties, but, especially when used in the application utilizing the reflective polarizing function or the like, the multilayer laminated film is desirably a uniaxially stretched film. The uniaxially stretched film in the invention includes a film which is stretched only in a uniaxial direction, and a film which is stretched in a biaxial direction and which is more extensively stretched in one direction. The uniaxially stretching direction may be any of the longitudinal direction and the width direction of the film. Further, in the case of the film which is stretched in a biaxial direction and which is more extensively stretched in one direction, the more extensively stretching direction may be any of the longitudinal direction and the width direction of the film, and, in the direction in which the stretch ratio is lower, the stretch ratio is preferably as low as about 1.03 to 1.20 times from the viewpoint of improving the polarizing performance. In the case of the film which is stretched in a biaxial direction and which is more extensively stretched in one direction, the "uniaxially stretching direction" indicates the more extensively stretching direction in relation to the polarization and the refractive index. In the invention, the uniaxially stretching direction, and the more extensively stretching direction in the biaxial stretching are frequently referred to as "X direction".

In the uniaxially stretched film, the difference in the refractive index in the X direction between the first layer and the second layer is preferably 0.10 to 0.45. When the difference in the refractive index in the X direction is in the above range, the reflecting properties in the X direction can be advantageously efficiently improved, so that high reflectance can be obtained with the smaller number of the laminated layers.

Further, the difference in the refractive index in the Y direction between the first layer and the second layer is preferably 0.05 or less. When the difference in the refractive index in the Y direction between the layers is in the above range, the reflectance in the Y direction can be reduced, and thus the polarizing performance as well as the reflecting properties in the X direction are advantageously further improved.

When the film is used as a luminance improving member or a reflective polarizer for liquid crystal display or the like, preferred are high refractive index properties such that the refractive index nX in the X direction in the first layer is 1.80 to 1.90. When the refractive index in the X direction in the first layer is in the above range, the difference in refractive index between the first layer and the second layer can be easily increased, so that the film can further exhibit reflective polarizing performance. Further, the difference between the refractive index nY of the first layer after uniaxially stretching in the Y direction and the refractive index nZ after uniaxially stretching in the Z direction is preferably 0.05 or less.

The uniaxially stretched film has unbalanced orientation, and hence is more likely to curl upon being treated at high temperatures and therefore, the idea of the invention can be more advantageously applied to the uniaxially stretched film.

[Method for Producing the Multilayer Laminated Film]

The method for producing the multilayer laminated film of the invention is described below in detail. The method for producing the multilayer laminated film described below is merely an example, and the method in the present invention is not limited to this. Further, different modes of films can be obtained with reference to the following method.

The multilayer laminated film of the invention can be obtained by a method in which a polymer constituting the first layer and a polymer constituting the second layer are alternately laminated in a molten state using a multilayer feed block apparatus to form an alternately laminated material having 30 layers or more in total, and a buffer layer is formed on both sides of the laminated material, and then, using an apparatus called layer doubling, the alternately laminated material having the buffer layers is divided into, for example, 2 to 4 parts, and the number of the laminated layers is increased by a method of re-laminating the alternately laminated material having the buffer layers as one block on another one so that the number of the laminated blocks (doubling number) increases 2 to 4 times. By the above method, the multilayer laminated film having inside the multilayer structure an intermediate layer composed of two buffer layers laminated, and having outermost layers each composed of one buffer layer respectively on both sides of the multilayer structure can be obtained.

The above-mentioned multilayer structure is obtained by conducting lamination so that the thickness of each layer for the first layer and the second layer has a desired slope structure. This can be achieved by, for example, changing the gap or length of the slit in a multilayer feed block apparatus.

The layers are laminated with the desired number by the above-mentioned method, and then extruded from a die, and cooled on a casting drum to obtain a multilayer unstretched film. The multilayer unstretched film is preferably stretched in at least a uniaxial direction (wherein the uniaxial direction is a direction along the film plane) selected from the film-forming machine axial direction (which is also referred to as "machine direction", "longitudinal direction", or "MD") and the direction perpendicular to the machine direction in the plane of the film (which is also referred to as "transverse direction", "width direction", or "TD"). The stretching temperature is preferably in the range of the glass transition temperature (Tg) of the polymer for the first layer to (Tg+20°) C. By stretching the film at a temperature lower than a conventional stretching temperature, it is possible to more precisely control the orientation properties of the film.

The stretch ratio is preferably 2.0 to 7.0 times, further preferably 4.5 to 6.5 times. The stretch ratio is preferably larger within the above range because the unevenness of the refractive index in the plane direction in the individual layers in the first layer and the second layer is reduced due to the reduction of the layer thickness by stretching, so that the interference of light by the multilayer laminated film becomes uniform in the plane direction, and further the difference in the refractive index in the stretching direction between the first layer and the second layer is increased. As a stretching method in this case, a known stretching method, such as heat stretching using a rod heater, roll heat stretching, or tenter stretching, can be used, but tenter stretching is preferred from the viewpoint of suppressing the formation of a flaw due to contact with a roll, achieving a suitable stretching speed, and the like.

When biaxially stretching is done by performing a stretching treatment in the direction (Y direction) perpendicular to the stretching direction in the plane of the film, the stretch ratio varies depending on the use of the film, but is preferably as low as about 1.03 to 1.20 times for obtaining a film having reflective polarizing properties. When the stretch ratio in the Y direction is higher than the above value, the polarizing performance is likely to become poor.

Further, after stretching, by re-stretching the film in the stretching direction in the range of 5 to 15% while performing heat set at a temperature of (Tg) to (Tg+30)° C., it is possible to more precisely control the orientation properties of the obtained multilayer laminated film.

In the invention, when the above-mentioned coating layer is formed, the application of the coating liquid to the multilayer laminated film can be conducted in an arbitrary stage, but is preferably conducted during the process of producing the film, and the coating liquid is preferably applied to the film before being stretched.

Thus, the multilayer laminated film of the invention is obtained.

When the multilayer laminated film is used in applications, such as a metalescent film and a reflective mirror, the multilayer laminated film is preferably a biaxially stretched film. In this case, any of a successive biaxial stretching method and a simultaneous biaxial stretching method may be used. Further, the stretch ratio may be selected so that the refractive index and thickness of each layer for the first layer and the second layer cause desired reflecting properties, but, for example, taking into consideration a general refractive index of the resin constituting these layers, the stretch ratio both in the machine direction and the transverse direction may be about 2.5 to 6.5 times.

[Use]

Hereinbelow, uses to which the multilayer laminated film of the invention is preferably applied are descried.

(Luminance Improving Member)

By employing an embodiment having the above-mentioned polymer composition, layer construction, and orientation, the multilayer laminated film of the invention can have performance such that the film selectively reflects one polarized light component and selectively transmits another polarized light component perpendicular to the above polarized light component. More specifically, such an embodiment is the multilayer laminated film which is uniaxially stretched. By utilizing the above performance, the multilayer laminated film can be used as a luminance improving member for liquid crystal display or the like. When used as a luminance improving member, the multilayer laminated film transmits one polarized light component, and does not absorb another polarized light component, which the film does not transmit, but reflects it to the light source side so that the light can be reused, obtaining excellent luminance improvement effect.

Further, on at least one side of the multilayer laminated film of the invention, a curing resin layer, such as a prism layer or a diffusion layer, may be laminated. The curing resin layer is a thermosetting resin layer or an electron beam curing resin layer. In this instance, the prism layer or diffusion layer can be advantageously laminated through a coating layer having a primer function or the like.

By laminating a member, such as a prism layer, on the multilayer laminated film of the invention to form a single unit, the number of the members to be assembled can be reduced, making it possible to reduce the thickness of the liquid crystal display. Further, by laminating the above member on the preferred multilayer laminated film of the invention, delamination caused due to external force applied during processing or the like can be suppressed, and therefore a luminance improving member having higher reliability can be provided.

When the multilayer laminated film of the invention is used as a luminance improving member, there can be mentioned a liquid crystal display device of a mode in which the luminance improving member is disposed between a light source for liquid crystal display and a liquid crystal panel composed of a polarizer/liquid crystal cell/polarizer. When a prism layer is further formed, it is preferred that the prism layer is disposed on the luminance improving member on the liquid crystal panel side.

(Reflective Polarizer)

The multilayer laminated film of the invention and an absorptive polarizer can be used in combination or the multilayer laminated film in an independent form can be used as a polarizer for liquid crystal display or the like. Particularly, with respect to the multilayer laminated film having improved reflective polarizing performance and having high degree of polarization such that the below-mentioned degree of polarization (P) is 85% or more, preferably 90% or more, more preferably 99.5% or more, without using an absorptive polarizer, the multilayer laminated film in an independent form can be used as a polarizer for liquid crystal display, which is used so as to be adjacent to a liquid crystal cell.

As an example of the use of the laminated multilayer film of the invention, more specifically, there can be mentioned a liquid crystal display in which a first polarizer formed from the laminated multilayer film of the invention, a liquid crystal cell, and a second polarizer are laminated in this order.

EXAMPLES

Hereinbelow, the present invention will be described with reference to the following Examples, which should not be construed as limiting the scope of the invention. The physical properties and characteristics shown in the following Examples were measured or evaluated by the methods described below.

(1) Whole Thickness of a Film

A sample of a film was set to a spindle detector (K107C, manufactured by Anritsu Corporation), and, using a digital differential electronic micrometer (K351, manufactured by Anritsu Corporation), a thickness was measured at 10 different positions, and an average of the measured values was determined and taken as a thickness of the film.

(2) Thickness of Each Layer

A multilayer laminated film was cut 2 mm in the longitudinal direction of the film and 2 cm in the width direction and fixed to an embedding capsule, and then embedded in an epoxy resin (Epomount, manufactured by Refine Tec Ltd.). The embedded sample was cut vertically in the width direction by means of a microtome (ULTRACUT UCT, manufactured by LEICA Biosystems Nussloch GmbH) to obtain an ultra-thin section having a thickness of 50 nm. Using a transmission electron microscope (Hitachi S-4300), the section was observed at an accelerating voltage of 100 kV to take a photograph, and a thickness of each layer was measured from the photograph.

With respect to the layers having a thickness of more than 1 μm, a layer which is present inside the multilayer structure was regarded as an intermediate layer, and a layer which is present on the outermost surface layer of the multilayer structure was regarded as an outermost layer, and a thickness of each of the layers was measured. Based on the measured thickness values of the layers, the ratio of the thickness of the outermost layer 1 to the thickness of the outermost layer 2, and the ratio of the total thickness of the outermost layer 1 and the outermost layer 2 to the total thickness of the multilayer structure (100%) were determined.

In each of the first layer and the second layer, with respect to the region in which the thickness is increased along the thickness direction, the layers were numbered, and, with respect to 15% of the layers, in terms of the number of the layers, which layers have a larger thickness in the region, an average of the thicknesses was calculated and taken as a maximum 15% average thickness. Further, with respect to 15% of the layers, in terms of the number of the layers, which layers have a smaller thickness in the region, an average of the thicknesses was calculated and taken as a minimum 15% average thickness, and the ratio of the maximum 15% average thickness to the minimum 15% average thickness was calculated.

Further, with respect to the multilayer structure which occupies a larger part of the multilayer structures having a slope of the thickness, the increasing direction of the thickness was checked, and a sample in which the thickness was increased from the outermost layer 2 side to the outermost layer 1 side was rated "◯", and a sample in which the thickness was increased from the outermost layer 1 side to the outermost layer 2 side was rated "x".

Furthermore, in each of the first layer and the second layer, with respect to the multilayer structure which occupies a larger part of the multilayer structures having a slope of the thickness, the layers in the region in which the thickness is increased were equally divided into five areas, in terms of the number of the layers, and a case where the average of thicknesses in each area equally divided was monotonously increased from the outermost layer 2 side to the outermost layer 1 side was regarded as a monotonous increase (rating ◯), and the other case was regarded as not being a monotonous increase (rating x).

(3) Curling

A 10 cm×10 cm (X direction×Y direction) sample was put on a glass plate so that the side of the outermost layer 1 was turned up, and placed in an oven set at 90° C. After one hour, the sample in the state of being put on the glass plate was taken out of the oven, and allowed to stand in an environment at room temperature for 30 minutes. Then, heights of the four corners of the sample from the glass plate surface were measured using a ruler, and an average of the heights was determined as a value of curling. In the measurement, a ruler having graduations at 0.5 mm was used, and, with respect to the value between graduation marks, the mark close to the target was read, and a value was determined at a scale span of 0.5 mm. When the four corners of the sample were not away from the glass plate, that is, curling such that the sample downwardly protrudes did not occur, the sample was turned upside down and placed on the glass plate so that the side of the outermost layer 2 was turned up, and further heights of the four corners of the sample from the glass plate surface were similarly measured using a ruler, and an average of the heights was determined as a value of curling. When the four corners of the sample rose toward the outermost layer 1 side, the curling value was a positive number, and, when the four corners rose toward the outermost layer 2 side, the curling value was a negative number.

An absolute value of a curling value is preferably smaller. Specifically, an absolute value of a curling value is preferably less than 4.0 mm, more preferably 3.5 mm or less, further preferably 3.0 mm or less, especially preferably 2.5 mm or less.

(4) Degree of Polarization (P)

Using a polarizing film measurement apparatus ("VAP7070S", manufactured by JASCO Corporation), a visibility correction polarization degree of the obtained multilayer laminated film was measured and taken as a degree of polarization (P) (unit: %). In the measurement, a spot diameter control mask Φ 1.4 and a deviation stage were used, and the angle of incidence of a measurement light was set at 0 degrees, and a degree of polarization was calculated based on an average transmittance (wavelength range: 400 to 800 nm) at each of the transmission axis of the multilayer laminated film determined by a crossed Nicols search (650 nm) and the axis perpendicular to the transmission axis.

When the degree of polarization (P) is 60% or more, there can be a use to which the multilayer laminated film can be applied. When applied to an optical use, such as a luminance improving member, the degree of polarization is preferably 70% or more, more preferably 80% or more, further preferably 85% or more.

Example 1

(Polyester A)

A polyester for the first layer was prepared as follows. Dimethyl 2,6-naphthalenedicarboxylate, dimethyl terephthalate, and ethylene glycol were subjected to transesterification reaction in the presence of titanium tetrabutoxide, and subsequently further subjected to polycondensation reaction to prepare a copolymerized polyester in which 95 mol % of the acid component is a 2,6-naphthalenedicarboxylic acid component, 5 mol % of the acid component is a terephthalic acid component, and the glycol component is an ethylene glycol component (intrinsic viscosity: 0.64 dl/g, in o-chlorophenol, at 35° C.; this applies to the following).

(Polyester B)

A polyester for the second layer was prepared as follows. Dimethyl 2,6-naphthalenedicarboxylate, dimethyl terephthalate, ethylene glycol, and trimethylene glycol were subjected to transesterification reaction in the presence of titanium tetrabutoxide, and subsequently further subjected to polycondensation reaction to prepare a copolymerized polyester in which 50 mol % of the acid component is a 2,6-naphthalenedicarboxylic acid component, 50 mol % of the acid component is a terephthalic acid component, 85 mol % of the glycol component is an ethylene glycol component, and 15 mol % of the glycol component is a trimethylene glycol component (intrinsic viscosity: 0.63 dl/g).

(Coating Liquid A)

An aqueous coating liquid having a solids concentration of 4% by mass and having a composition for solids such that the below-shown acrylic binder, surfactant, and particles were mixed in a mass ratio of 89:10:1 was prepared.

Acrylic binder: which comprises methyl methacrylate: 60 mol %/ethyl acrylate: 30 mol %/2-hydroxyethyl acrylate: 5 mol %/N-methylolacrylamide: 5 mol % (Tg=40° C.). 302 parts of ion-exchanged water was added to a four neck flask and the temperature was increased to 60° C. in a nitrogen gas stream, and then 0.5 parts of ammonium persulfate and 0.2 parts of sodium hydrogensulfite were added as a polymerization initiator, and further a mixture of 46.7 parts of methyl methacrylate, 23.3 parts of ethyl acrylate, 4.5 parts of 2-hydroxyethyl acrylate, and 3.4 parts of N-methylolacrylamide, which are monomers, was added dropwise to the resultant mixture over 3 hours while controlling the temperature of the mixture to be 60 to 70° C. After completion of the addition, the reaction was continued while stirring and maintaining the temperature in the same range for 2 hours, followed by cooling, to obtain an aqueous acrylic dispersion having a solids content of 25% by mass.

Surfactant: Polyoxyethylene tribenzylphenyl ether

Particles: Spherical acrylic particles (average particle diameter: 150 nm; trade name "EPOSTAR MX-100W", manufactured by Nippon Shokubai Co., Ltd.)

(Multilayer Laminated Film)

The above-mentioned polyester for the first layer (which corresponds to the polyester A) was dried at 170° C. for 5 hours, and the above-mentioned polyester for the second layer (which corresponds to the polyester B) was dried at 85° C. for 8 hours, and then they were respectively fed to first and second extruders and heated to 300° C. so that they were in a molten state. The polyester for the first layer was divided into 138 layers, and the polyester for the second layer was divided into 137 layers, and then, using a multilayer feed block apparatus for alternately laminating the first layer and the second layer so that the thickness of the first layer and the thickness of the second layer are increased along the thickness direction from the below-mentioned outermost layer 2 side to the outermost layer 1 side, a melt in a laminated state having 275 layers in which the first layer and the second layer were alternately laminated was obtained. In this instance, the extrusion rate was controlled so that the average thickness ratio of the first layer and the second layer in the finally obtained film became 1.0:1.3. While maintaining the laminated state, the same polyester as the polyester for the second layer was introduced to both sides of the melt from a third extruder toward a three-layer feed block to further laminate a buffer layer on both sides in the laminating direction of the melt in a laminated state having 275 layers. The feed rate of the third extruder was controlled so that the (thickness of the outermost layer 1)/(thickness of the outermost layer 2) ratio became 1.2 and the total thickness of the buffer layers on both sides became 40% of the whole thickness of the film. The laminated state was further divided into two parts using a layer doubling block and they were laminated at a ratio of 1:1, and, while maintaining the laminated state having 553 layers in total including one intermediate layer having two buffer layers bonded inside the laminate and two outermost layers in total on the respective surface layers, the resultant laminate was introduced to a die, and cast on a casting drum to form an unstretched multilayer laminated film having 553 layers in total.

The coating liquid A was uniformly applied by means of a roll coater onto the outermost layer 2 of the unstretched multilayer laminated film so that the thickness of the coating after being stretched and dried became 0.1 μm.

The unstretched multilayer laminated film obtained after the application was introduced to a stenter, and stretched in the width direction at a ratio of 6.0 times at a temperature of 135° C., and subjected to heat set at 150° C. for 20 seconds to obtain a multilayer laminated film. The obtained multilayer laminated film had a thickness of 75 μm. Further, the first layer was birefringent, and the second layer, the outermost layers, and the intermediate layer were isotropic.

Examples 2 to 9 and Comparative Examples 1 to 3

Multilayer laminated films were obtained in substantially the same manner as in Example 1 except that the thickness of each layer, the total number of the layers, and the increasing direction of the thickness in the thickness direction were changed as shown in Table 1. Physical properties of the thus obtained multilayer laminated films are shown in Table 1. In each of the obtained multilayer laminated films, the first layer was birefringent, and the second layer, the outermost layers, and the intermediate layer were isotropic.

The total number of the layers was changed by changing the first dividing number. Specifically, in Example 5, the polyester for the first layer was divided into 180 layers, and the polyester for the second layer was divided into 179 layers. In Example 6, the polyester for the first layer was divided into 45 layers, and the polyester for the second layer was divided into 44 layers. In Example 7, the polyester for the first layer was divided into 270 layers, and the polyester for the second layer was divided into 269 layers. In Example 8, the polyester for the first layer was divided into 71 layers, and the polyester for the second layer was divided into 70 layers. In Comparative Example 3, the polyester for the first layer was divided into 200 layers, and the polyester for the second layer was divided into 199 layers.

[Formation of a Prism Lens Layer]

An ultraviolet curing acrylic resin having the below-shown composition was poured into a glass die having formed a pattern for a prism lens, and the above-obtained film was placed on the resin so that the coating surface of the film was in close contact with the resin side, and the resin was cured by irradiation with a light using an ultraviolet lamp (intensity of irradiation: 80 W/cm, 6.4 KW) at a distance of 30 cm from the surface side of the glass die for 30 seconds to form a prism lens layer having a vertical angle of 90 degrees, a pitch of 50 μm, and a height of 30 μm, obtaining a luminance improving sheet.

<Ultraviolet Cuing Acrylic Resin>

Ethylene oxide-modified bisphenol A dimethacrylate (FA-321M, manufactured by Hitachi Chemical Co., Ltd.) 46% by mass Neopentyl glycol-modified trimethylolpropane diacrylate (R-604, manufactured by Nippon Kayaku Co., Ltd.) 25% by mass Phenoxyethyl acrylate (Viscoat 192, manufactured by Osaka Organic Chemical Industry Ltd.) 27% by mass 2-Hydroxy-2-methyl-1-phenylpropan-1-one (Darocur 1173, manufactured by Merck & Co., Inc.) 2% by mass

TABLE 1

| | | | Exp. 1 | Exp. 2 | Exp. 3 | Exp. 4 | Exp. 5 | Exp. 6 |
|---|---|---|---|---|---|---|---|---|
| Total number of layers | Outermost layer + Intermediate layer + First layer + Second layer | Layer | 553 | 553 | 553 | 553 | 721 | 181 |
| Multilayer laminated film | Whole thickness of film | μm | 75 | 75 | 75 | 75 | 75 | 75 |
| Outermost layer | Thickness of outermost layer 1 | μm | 8.2 | 10.7 | 12.5 | 13.6 | 6.9 | 25.0 |
| | Thickness of outermost layer 2 | μm | 6.8 | 4.3 | 2.5 | 1.4 | 1.4 | 5.0 |
| | Thickness of outermost layer 1/ Thickness of outermost layer 2 | — | 1.2 | 2.5 | 5.0 | 9.7 | 4.9 | 5.0 |
| | Ratio of total thickness of outermost layers to total thickness of multilayer structure (100%) | % | 33 | 33 | 33 | 33 | 14 | 200 |
| | Ratio of total thickness of outermost layers to whole thickness of film (100%) | % | 20 | 20 | 20 | 20 | 11 | 40 |
| Intermediate layer | Thickness | μm | 15 | 15 | 15 | 15 | 8.3 | 30 |
| Multilayer structure (First layer) | Maximum thickness | nm | 330 | 330 | 330 | 330 | 330 | 330 |
| | Minimum thickness | nm | 15 | 15 | 15 | 15 | 15 | 15 |
| | Maximum 15% average thickness | nm | 210 | 210 | 210 | 210 | 210 | 210 |
| | Minimum 15% average thickness | nm | 60 | 60 | 60 | 60 | 60 | 60 |
| | Maximum 15% average thickness/ Minimum 15% average thickness | — | 3.5 | 3.5 | 3.5 | 3.5 | 3.5 | 3.5 |
| | Increased from outermost layer 2 side to outermost layer 1 side | o/x | o | o | o | o | o | o |
| | Monotonous increase | o/x | o | o | o | o | o | o |
| Multilayer structure (Second layer) | Maximum thickness | nm | 360 | 360 | 360 | 360 | 360 | 360 |
| | Minimum thickness | nm | 18 | 18 | 18 | 18 | 18 | 18 |
| | Maximum 15% average thickness | nm | 228 | 228 | 228 | 228 | 228 | 228 |
| | Minimum 15% average thickness | nm | 65 | 65 | 65 | 65 | 65 | 65 |
| | Maximum 15% average thickness/ Minimum 15% average thickness | — | 3.5 | 3.5 | 3.5 | 3.5 | 3.5 | 3.5 |
| | Increased from outermost layer 2 side to outermost layer 1 side | o/x | o | o | o | o | o | o |
| | Monotonous increase | o/x | o | o | o | o | o | o |
| Properties | Curling value | mm | −2.5 | −0.5 | 1.0 | 2.5 | 2.0 | 0.0 |
| | Degree of polarization | % | 86 | 86 | 86 | 86 | 89 | 60 |

| | | | Exp. 7 | Exp. 8 | Exp. 9 | Comp. Exp. 1 | Comp. Exp. 2 | Comp. Exp. 3 |
|---|---|---|---|---|---|---|---|---|
| Total number of layers | Outermost layer + Intermediate layer + First layer + Second layer | Layer | 1081 | 285 | 553 | 553 | 553 | 801 |
| Multilayer laminated film | Whole thickness of film | μm | 75 | 75 | 75 | 75 | 75 | 75 |
| Outermost layer | Thickness of outermost layer 1 | μm | 12.5 | 12.5 | 13.9 | 7.5 | 6.2 | 2.7 |
| | Thickness of outermost layer 2 | μm | 2.5 | 2.5 | 1.1 | 7.5 | 8.8 | 2.3 |

TABLE 1-continued

|  |  |  |  |  |  |  |  |  |
|---|---|---|---|---|---|---|---|---|
|  | Thickness of outermost layer 1/<br>Thickness of outermost layer 2 | — | — | 5.0 | 5.0 | 12.6 | 1.0 | 0.7 | 1.2 |
|  | Ratio of total thickness of outermost layers to total thickness of multilayer structure (100%) | % | 33 | 33 | 33 | 33 | 33 | 8 |
|  | Ratio of total thickness of outermost layers to whole thickness of film (100%) | % | 20 | 20 | 20 | 20 | 20 | 7 |
| Intermediate layer | Thickness | μm | 15 | 15 | 15 | 15 | 15 | 5 |
| Multilayer structure (First layer) | Maximum thickness | nm | 120 | 690 | 330 | 330 | 330 | 330 |
|  | Minimum thickness | nm | 15 | 15 | 15 | 15 | 15 | 15 |
|  | Maximum 15% average thickness | nm | 78 | 468 | 210 | 210 | 210 | 210 |
|  | Minimum 15% average thickness | nm | 60 | 60 | 60 | 60 | 60 | 60 |
|  | Maximum 15% average thickness/<br>Minimum 15% average thickness | — | 1.3 | 7.8 | 3.5 | 3.5 | 3.5 | 3.5 |
|  | Increased from outermost layer 2 side to outermost layer 1 side | o/x | o | o | o | o | o | o |
|  | Monotonous increase | o/x | o | o | o | o | o | o |
| Multilayer structure (Second layer) | Maximum thickness | nm | 130 | 710 | 360 | 360 | 360 | 360 |
|  | Minimum thickness | nm | 18 | 18 | 18 | 18 | 18 | 18 |
|  | Maximum 15% average thickness | nm | 85 | 507 | 228 | 228 | 228 | 228 |
|  | Minimum 15% average thickness | nm | 65 | 65 | 65 | 65 | 65 | 65 |
|  | Maximum 15% average thickness/<br>Minimum 15% average thickness | — | 1.3 | 7.8 | 3.5 | 3.5 | 3.5 | 3.5 |
|  | Increased from outermost layer 2 side to outermost layer 1 side | o/x | o | o | o | o | o | o |
|  | Monotonous increase | o/x | o | o | o | o | o | o |
| Properties | Curling value | mm | 0.5 | 2.0 | 3.0 | −5.0 | −7.0 | −4 |
|  | Degree of polarization | % | 84 | 85 | 86 | 86 | 86 | 86 |

INDUSTRIAL APPLICABILITY

By the present invention, the multilayer laminated film of the invention is prevented from curling upon being treated at high temperatures, despite having a structure in which a birefringent layer and an isotropic layer are alternately laminated on one another, wherein the thickness of each layer is increased in the thickness direction. Therefore, the multilayer laminated film is unlikely to curl when the film is heat-treated in the post-processing therefor or the film in the form of an ultimate product is used at high temperatures, and hence, when the multilayer laminated film is used in, for example, a luminance improving member, a reflective polarizer or the like required to have polarizing performance, there can be provided a luminance improving member, a polarizer for liquid crystal display, and the like each having higher reliability.

The invention claimed is:

1. A multilayer laminated film comprising: a multilayer structure; an outermost layer 1 composed mainly of a resin on one side of the multilayer structure; and an outermost layer 2 composed mainly of a resin on another side, wherein
the multilayer laminated film has a structure in which a birefringent layer and an isotropic layer are alternately laminated in a thickness direction so that the total number of the birefringent and isotropic layers is 30 or more,
each of the birefringent layers is composed mainly of a resin and has a thickness of 10 nm to 1,000 nm, each of the isotropic layers is composed mainly of a resin and has a thickness of 10 nm to 1,000 nm,
the thickness of the birefringent layers increases along the thickness direction from the outermost layer 2 side to the outermost layer 1 side, and the thickness of the isotropic layers increases along the thickness direction from the outermost layer 2 side to the outermost layer 1 side,
when the total thickness of the multilayer structure is taken as 100%, the combined thickness of the outermost layer 1 and the outermost layer 2 is 10% or more, and
the thickness of the outermost layer 1 is larger than the thickness of the outermost layer 2.

2. The multilayer laminated film according to claim 1, which has a (thickness of the outermost layer 1)/(thickness of the outermost layer 2) ratio of 1.1 to 10.0.

3. The multilayer laminated film according to claim 1, wherein the birefringent layers increasing in thickness along the thickness direction have a (maximum 15% average thickness)/(minimum 15% average thickness) ratio of 1.2 to 8.0, and the isotropic layers increasing in thickness along the thickness direction have a (maximum 15% average thickness)/(minimum 15% average thickness) ratio of 1.2 to 8.0,
wherein the maximum 15% average thickness is a value obtained by, with respect to the region of the birefringent layers or the isotropic layers in which the thickness is increased, extracting 15% of the layers present in the region, in terms of the number of the layers, which layers have a larger thickness in the region, and determining an average of the thickness of the extracted layers, and the minimum 15% average thickness is a value obtained by, with respect to the region of the birefringent layers or the isotropic layers in which the thickness is increased, extracting 15% of the layers present in the region, in terms of the number of the layers, which layers have a smaller thickness in the region, and determining an average of the thickness of the extracted layers.

4. The multilayer laminated film according to claim 1, wherein the birefringent layers increasing in thickness along the thickness direction monotonously increase in thickness, and the isotropic layers increasing in thickness along the thickness direction monotonously increase in thickness.

5. The multilayer laminated film according to claim 1, wherein the resin constituting the birefringent layers is an oriented crystalline resin.

6. The multilayer laminated film according to claim 1, wherein both the outermost layer 1 and the outermost layer 2 have isotropic properties.

7. A multilayer laminated film product comprising: the multilayer laminated film according to claim 1; and a coating layer on the outermost layer 1 or the outermost layer 2 of the multilayer laminated film.

8. A multilayer laminated film product comprising: the multilayer laminated film according to claim 1; and a curing resin layer on the outermost layer 1 or the outermost layer 2 of the multilayer laminated film.

9. The multilayer laminated film according to claim 2, wherein the birefringent layers increasing in thickness along the thickness direction have a (maximum 15% average thickness)/(minimum 15% average thickness) ratio of 1.2 to 8.0, and the isotropic layers increasing in thickness along the thickness direction have a (maximum 15% average thickness)/(minimum 15% average thickness) ratio of 1.2 to 8.0, wherein the maximum 15% average thickness is a value obtained by, with respect to the region of the birefringent layers or the isotropic layers in which the thickness is increased, extracting 15% of the layers present in the region, in terms of the number of the layers, which layers have a larger thickness in the region, and determining an average of the thickness of the extracted layers, and the minimum 15% average thickness is a value obtained by, with respect to the region of the birefringent layers or the isotropic layers in which the thickness is increased, extracting 15% of the layers present in the region, in terms of the number of the layers, which layers have a smaller thickness in the region, and determining an average of the thickness of the extracted layers.

* * * * *